United States Patent [19]
Smith

[11] 3,863,256
[45] Jan. 28, 1975

[54] METHOD AND APPARATUS FOR DEVELOPING RELATIVE DIRECTION AND DISTANCE DATA

[75] Inventor: Spurgeon E. Smith, Austin, Tex.

[73] Assignee: Tracor, Inc., Austin, Tex.

[22] Filed: Nov. 8, 1972

[21] Appl. No.: 304,855

Related U.S. Application Data

[63] Continuation-in-part of Ser. No. 269,442, July 6, 1972, abandoned.

[52] U.S. Cl. ........ 343/112 R, 235/150.27, 343/6 R, 343/112 D
[51] Int. Cl. .............................................. G01s 5/04
[58] Field of Search .................... 343/112 R, 112 D; 235/150.27

[56] References Cited
UNITED STATES PATENTS

| | | | |
|---|---|---|---|
| 2,958,866 | 11/1960 | Atanasoff | 343/112 D |
| 3,353,179 | 11/1967 | Cartwright | 343/12 MP |

*Primary Examiner*—Maynard R. Wilbur
*Assistant Examiner*—Richard E. Berger

[57] ABSTRACT

Method and apparatus for locating one object with respect to another, one of which is moving, from assumed bearing and range information and, through iterative computation with information derived from continuously comparing the phase or frequency of a received signal from the object to be located with the phase or frequency of the reference signal at the other object, developing a time history of relative distance traveled, from which the assumed bearing and range information is refined into precise direction and distance data.

28 Claims, 4 Drawing Figures

METHOD AND APPARATUS FOR DEVELOPING RELATIVE DIRECTION AND DISTANCE DATA

This is a continuation-in-part of co-pending application Ser. No. 269,442, filed July 6, 1972, now abandoned, of the same inventor.

BACKGROUND OF THE INVENTION

1. Field of the Invention

This invention relates to relative location analysis and more specifically to determining direction or bearing and distance or range from a source to a moving vehicle (or vice versa) using information contained in a stable signal, preferably in the modulation of a stable sinusoidal wave on a carrier wave.

2. Description of the Prior Art

It is often desirable to determine the direction and distance of an object with respect to a reference location. Once this relative information is determined, then from independent knowledge of the position location of the reference, it is possible to precisely locate the object of previous unknown location.

For example, buoys dropped from airplanes are subject to drift while in the air and to further drift from currents in the water. Nevertheless, it is necessary for purposes of navigation with respect to these buoys to know exactly where the dropped buoys are at any given time.

Buoys can carry self-contained transmitters and other circuitry operable for relatively long periods of time, deriving power from self-contained battery packs or the like. They are not manned, however, and it would not be economical for them to carry too much in the way of electronics.

Visual location of such buoys is not always possible, since such buoys or other relatively small objects are often hard to visually detect because of possible inclement weather conditions and because suspected locations may be somewhat different from actual locations. Further, it is not always possible or desirable to fly directly over an object to be located.

Location schemes, which may merely be thought of as navigation methods, in the past have employed doppler systems, radar systems, Loran-C or other fixed and synchronous transmitters, etc. All of these are available for location of objects, but all are extremely costly and no more reliable than the method employing the invention hereindisclosed.

Therefore, it is a feature of this invention to provide improved location of one object with respect to another, one of which is moving without using an interrogating, transmitter system (e.g., Loran-C).

It is another feature of this invention to provide improved location of one object with respect to another, one of the objects moving, using in a preferred embodiment, a stable sine wave signal modulated onto a carrier, the carrier being for instance, in the VHF or UHF range.

It is still another feature of this invention to provide improved location of one object with respect to another, one of the objects moving, using iterative computational techniques, updating assumed bearing and range information in a computer with actual phase tracking data developed from comparing a demodulated received signal and a standard signal.

SUMMARY OF THE INVENTION

A preferred embodiment of the present invention for locating an object, which may be referred to as the source, with respect to another object, which may be referred to as the moving vehicle, includes a transmitter at the source for generating a source carrier wave having a stable sine wave signal modulated thereon, and at the moving vehicle, a receiver, a demodulator or other means for separating the received demodulation sine wave from the carrier and other signals, reference signal means, a comparator for continuously comparing the received demodulated signal with the reference signal and producing a digital output, and a computer for developing from the time history of the compared signals an indication of the changes in distance between the source and vehicle and the distance of the path of the vehicle with respect to the source, the computer updating assumed range and distance information. Absolute location of the source may be made if the vehicle is precisely located using other techniques.

BRIEF DESCRIPTION OF THE DRAWINGS

So that the manner in which the above-recited features, advantages and object of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted however that the appended drawings illustrate only typical embodiments of the invention and are therefore not to be considered limiting of its scope, for the invention may admit to other equally effective embodiments.

In the Drawings.

DESCRIPTION OF PREFERRED EMBODIMENT

Figure 1:
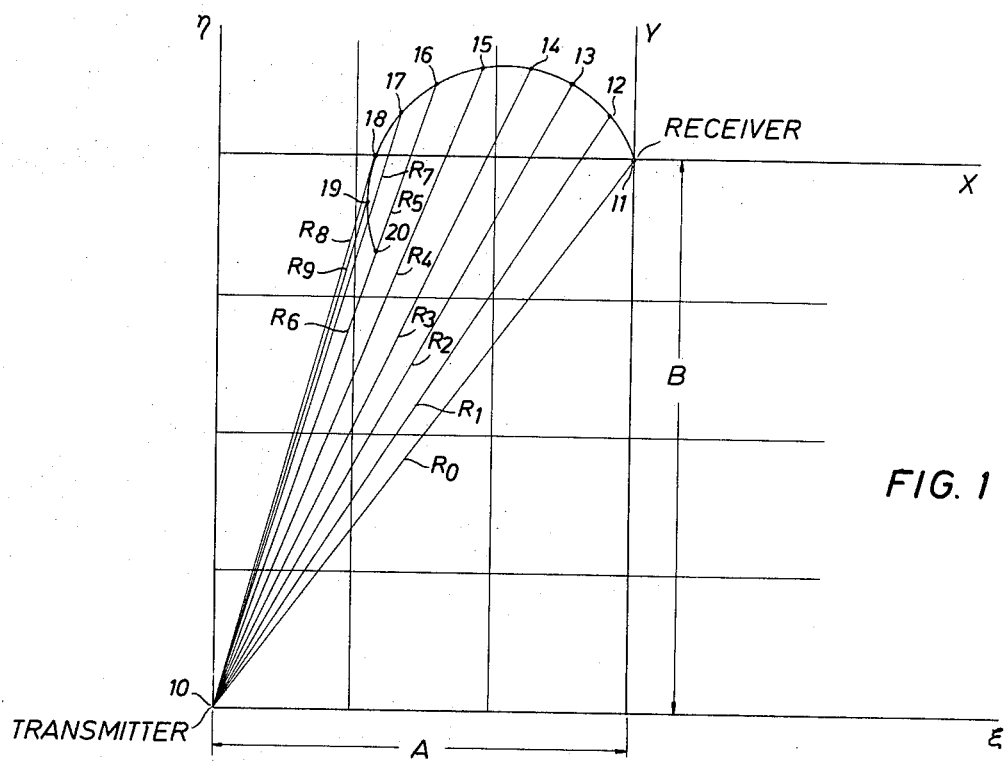
FIG. 1 is a graphical geometrical analysis of the invention operating in a typical fashion, wherein the moving vehicle is tracking a circular path.

Now referring to the drawings, and first to FIG. 1, an omnidirectional transmitter is shown emanating a signal which is received some distance away by a receiver. As illustrated, the transmitter is located at a source 10 and the receiver is located in a moving vehicle 11, which may be an aircraft. The transmitter at the source either transmits a stable carrier signal, or preferably, a carrier signal which is modulated by a stable sinusoidal modulation product. For purposes of discussion it is assumed that the source is fixed in the center of a Cartesian coordinate system having axes $\xi$, $\eta$. The vehicle at a time $t=0$ is centered in a parallel Cartesian coordinate system having axes $x$, $y$.

For further convenience of discussion at time $t=0$, the distance along the $\xi$ axis from source 10 to vehicle 11 is labeled distance A; the distance along the $\eta$ axis from source 10 to vehicle 11 is distance B, and the straight line distance from source 10 to vehicle 11 is distance $R_o$. At successive later times to be discussed more fully hereinafter, the distances from source 10 to vehicle 11 are $R_1, R_2, R_3, \ldots R_n$. In the general case, the distance between source 10 and receiver 11 is range R.

Hence, it may be seen that, in general, $R = [(A+x)^2 + (B+y)^2]^{1/2}$.

If the vehicle has aboard a stable signal generator producing a signal at or very near the stable signal emanating from the source, it is possible by conventional means to compare the received stable signal with the vehicle stable signal (reference signal) and develop phase or frequency difference data. When the vehicle moves in such a manner that there is indicated a complete cycle of phase shift due to movement of the vehicle, then the vehicle has moved one wave length of the reference signal frequency with respect to the source. If $\rho$ is equal to the range difference, then $\rho = R - R_o$ or $\rho + R_o = R$ or $\rho + R_o = [(A+x)^2 + (B+y)^2]^{1/2}$. By squaring both sides, the following results:

$\rho^2 + 2\rho R_o + R_o^2 = (A+x)^2 + (B+y)^2$ or
$\rho^2 + 2\rho R_o + R_o^2 = x^2 + 2Ax + y^2 + 2By + A^2 + B^2$.

But, $$R_o^2 = A^2 + B^2$$

So, $$\rho(\rho + 2R_o) = x(x + 2A) + y(y + 2B).$$

In a specific example, it is possible to develop actual values for the following table:

| Time | $\rho$ | $x$ | $y$ |
|---|---|---|---|
| $t_o$ | 0 | 0 | 0 |
| $t_1$ | $\rho 1$ | $x_1$ | $y_1$ |
| $t_2$ | $\rho 2$ | $x_2$ | $y_2$ |
| $t_3$ | $\rho 3$ | $x_3$ | $y_3$ |
| . | . | . | . |
| $t_n$ | $\rho n$ | $x_n$ | $y_n$ |

As already noted $\rho$ can be constantly monitored using phase comparison tecnhiques. Tables of values for distances $x$ and $y$ can be ascertained using conventional DME (distance measuring equipment) data, inertial navigation data, doppler dead-reckoning data, or by other conventional navigation means.

Note that in the last formula, there are only three unknown values when $\rho$, $x$ and $y$ are known. Therefore, from three or more entries past the first degenerate row from the table, values of $R_o$, $A$ and $B$ may be determined.

In practice, many more data points than the minimal three required will be available. On the other hand, some noise or error measurements may perturb the three measurements. Hence, it is convenient to apply the method of at least squares to minimize the error E in the following formula, such a solution is readily programmable on a general purpose computer.

$$E = \sqrt{\frac{\sum_{1}^{n} [\rho(\rho + 2R_o) - x(x + 2A) - y(y + 2B)]^2}{n}},$$

for trial values of $A$ and $B$, where, as before, $R_o = (A^2 + B^2)^{1/2}$.

An example using the above technique may be considered, again using the diagram shown in FIG. 1. In this example, the movement of vehicle 11 (flight of an aircraft) was set to be a part of a circle, although in the general case, random movement is permissible if all of the data is collected, as indicated below. Units were determined to be in thousands of yards and it was guessed that the aircraft was somewhere near where $A = 30$, $B = 40$. A course was set for the aircraft to track a part of a circle having a radius of approximately 10. Measurements were made periodically at about 20° sector intervals 12-20 along the circle for values of $x$, $y$ and $\rho$. Starting with point 11, the following table was developed:

| Point | $x$ | $y$ | $\rho$ |
|---|---|---|---|
| 11 | 0 | 0 | 0 |
| 12 | −1.7361 | 3.0077 | 1.4634 |
| 13 | −4.3969 | 5.2401 | 1.9825 |
| 14 | −7.6604 | 6.4279 | 1.5228 |
| 15 | −11.1334 | 6.4279 | .1148 |
| 16 | −14.3969 | 5.2401 | −2.1048 |
| 17 | −17.0574 | 3.0077 | −5.087 |
| 18 | −18.7938 | 2.4892E−05 | −8.4599 |
| 19 | −19.3969 | −3.4202 | −11.9145 |
| 20 | −18.7939 | −6.8404 | −14.998 |

The results for various trial A's and B's developed the following error values:

| | |
|---|---|
| A = 29, B = 40; | E = 20.4493 |
| A = 31, B = 40; | E = 20.329 |
| A = 29, B = 39; | E = 9.6513 |
| A = 30, B = 39; | E = 10.7795 |
| A = 31, B = 39; | E = 30.9977 |
| A = 29, B = 41; | E = 31.3591 |
| A = 30, B = 41; | E = 10.8434 |
| A = 31, B = 41; | E = 9.6434 |

Finally, with $A = 30$, $B = 40$, the error was equal to 6.79279E−06. This error of 6.79 square yards is negligible in terms of the first bad answer of 20,449,300 square yards, and hence the actual values of $A$ and $B$ are determined. With $A$ and $B$ known, $R_o$ readily computes to 50 units of distance (or 50,000 yards). Also, the direction of source 10 with respect to vehicle 11 is determined.

Although a circular path was assumed for purpose of the above illustration, it should be noted that the calculations are not at all based on the criticality of the path actually being circular or that the measurements were taken at exactly 20° intervals. It is believed that any path, regular or irregular, will yield data for determining $R$ and the angular direction, however, it is known that this is the case when the vehicle travels a generally circular path or a generally straight line path.

Iterative computational development of data for purposes herein includes the successive taking of data. The term "iterative" also applies, in some cases, to the processing of data wherein the results of one processing step is used in a subsequent similar step to obtain data refinement.

The successive iterative method just described using the least squares method to minimize an error E does take appreciable computer time and might be considered an indirect and inelegant process. A very direct method has been discovered for finding the values of A, B and $R_o$ which avoids the successive approximation steps provided the following measured sequences are linearly independent:

$x_1, x_2, \ldots, x_n$
$y_1, y_2, \ldots, y_n$
$\rho_1, \rho_2, \ldots, \rho_n$ This independency can be accomplished by making certain that the data gathering vehicle is not moving on a straight line during the data gathering period.

In this method all of the initial conditions are the same. These conditions assume a vehicle moving with respect to a source, the source emanating an omnidirectional stable frequency signal. Again such signal may preferably be a stable sine wave fm modulated on a carrier, the sine wave being a constant frequency in the range between 50 kHz and 500 kHz. Both the source and the moving vehicle are assigned the center of respective parallel systems of Cartesian coordinates. All of the assigned designations with respect to FIG. 1 discussed above apply.

Again at the receiving vehicle, the stable frequency signal is received. At a plurality of successive locations, the values of measured sequences $x$, $y$ and $\rho$ are developed, as before. The number of these selected locations may be mathematically identified by $n$; the first Cartesian axial distance moved by the vehicle from its initial position with respect to the source may be identified by $x$; the second Cartesian axial distance moved by the vehicle from its initial position with respect to the source may be identified by $y$; and the relative distance traveled by the vehicle, from its assigned initial position with respect to the source, may be identified by $\rho$.

As developed above, the following governing equation applies:

$$\rho(\rho + R_o) = x(x + 2A) + y(y + 2B),$$ wherein, A is equal to the first Cartesian coordinate axial distance from the source to the vehicle in the initial position; B is equal to the second Cartesian coordinate axial distance from the source to the vehicle in the initial position; and $R_o$ is equal to the distance between source and vehicle at the initial position, viz., $(A^2 + B^2)^{1/2}$.

From measured sequences $x$, $y$ and $\rho$, orthonormal sequences $\phi_x$, $\phi_y$ and $\phi_\rho$ are constructed such that there exist constants $C_{11}$, $C_{21}$, $C_{22}$, $C_{31}$, $C_{32}$ and $C_{33}$, defined as follows:

$C_{11} = \Sigma x(i) \phi_x(i)$,
$C_{21} = \Sigma y(i) \phi_x(i)$,
$C_{31} = \Sigma \rho(i) \phi_x(i)$,
$C_{22} = \Sigma y(i) \phi_y(i)$,
$C_{23} = \Sigma y(i) \phi_\rho (i)$, and
$C_{33} = \Sigma \rho(i) \phi_\rho (i)$, wherein, $(i)$ combined with another term merely means the general case. It should be noted that since the manipulation of data applies to sequences, a summation of terms through an "$(i)$" term, means a summation for all successive data measurements up to and including the "$(i)$" term.

Applying standard mathematical solutions applicable to orthonormal sequences to the above, the following equations are developed:

$x = C_{11}\phi_x$,
$y = C_{21}\phi_x + C_{22}\phi_y$, and
$\rho = C_{31}\phi_x + C_{32}\phi_y + C_{33}\phi_\rho$.

A convenient discussion of mathematical manipulation of orthonormal sequences may be found in "The Approximation of Functions, Linear Theory," Volume I, John R. Rice, Addison-Wesley 1964, pp. 45–46, Section 2-6, Theorems 2-7. Actually, the construction and use of orthonormal sequences has long been a standard mathematical technique and was probably discovered by Hilbert before 1,900. It is sometimes referred to as the "Gram-Schmidt" process.

The governing equation set out above may be rewritten in the following form:

$$\rho^2 - (x^2 + y^2)/2 = x \cdot A + y \cdot B - \rho \cdot R_o$$

Substituting for $x$, $y$ and $\rho$ on the right side of this equation, an equation containing the orthonormal sequences is developed, as follows: $\rho^2 - (x^2 + y^2)/2 = AC_{11}\phi_x + B(C_{21}\phi_x + C_{22}\phi_y) - R_o(C_{31}\phi_x + C_{32}\phi_y + C_{33}\phi_\rho)$.

When both sides of this equation are multiplied by $\phi_x$ and summed, the left side may be defined as $Z_x$. The right side becomes $AC_{11} + BC_{21} - R_oC_{31}$. Similarly, when both sides are multiplied by $\phi_y$ and summed, the left side may be defined as $Z_y$. The right side then becomes $BC_{22} - R_oC_{32}$. Finally, in like fashion, when both sides are multiplied by $\phi_\rho$ and summed, the left side may be defined as $Z_\rho$ and the right side becomes $-R_oC_{33}$. Solving these three last equations, gives the equations necessary for determining the actual values of $R_o$, $A$ and $B$, as follows:

$R_o = - Z_\rho /C_{33}$,
$B = Z_y + R_oC_{32}/C_{22}$, and
$A = Z_x + R_oC_{31} - BC_{21}/C_{11}$ Although it is more completely developed in the referenced article by Rice given above, it may be helpful in a quick understanding to note how the orthonormal sequences $\phi_x$, $\phi_y$ and $\phi$ are developed from measured sequences $x$, $y$ and $\rho$.

If $Q_{11} = \Sigma x(i)^2$,
then $\phi_x(i) = x(i)/Q_{11}^{1/2}$.
If $Q_{21} = \Sigma y(i) \phi_x(i)$, then $y(i)$ modified $= y(i) - Q_{21} \phi_x(i)$.

It is necessary to strip the $y$ terms of any $x$-like behavior, and hence the subtraction of the $Q_{21}\phi_x(i)$ term.

If $Q_{22} = \Sigma [y(i)$ modified$]^2$,
then $\phi_y(i) = y(i)$ modified$/Q_{22}^{1/2}$.
If $Q_{31} = \Sigma_\rho (i)\phi_x(i)$ and
$Q_{32} = \Sigma_\rho (i) \phi_y(i)$,
then $\rho(i)$ modified $= \rho(i) - Q_{31}\phi_x(i) - Q_{32}\phi_y(i)$.

It is necessary to strip the $\rho$ term of any $x$-like or $y$-like behavior, and hence the subtraction of the $Q_{31}\phi_x(i)$ and $\phi_{32}\phi_y(i)$ terms.

If $Q_{33} = \Sigma[\rho(i)$ modified$]^2$,
then $\phi_\rho (i) = \rho(i)$ modified$/Q_{33}^{1/2}$.

With $\rho$, $x$, $y$, $\phi_x$, $\phi_y$ and $\phi_\rho$ known, then $Z_x$, $Z_y$ and $Z$ are readily solvable. And with $Z_x$, $Z_y$ and $Z_\rho$ values plus the values of $C_{11}$, $C_{21}$, $C_{31}$, $C_{22}$, $C_{32}$ and $C_{33}$, the values of $R_o$, $A$ and $B$ are directly solvable.

A direct check on the results may be had owing to the fact that $R_o$ should equal $(A^2 + B^2)^{1/2}$.

The above discussion has assumed a two dimensional solution, which may be satisfactory for many purposes. However, in the general case, the problem is three-dimensional. The method described above is readily expandable using the Gram-Schmidt process. In such case, the third dimension would be the altitude $H$ of the vehicle and $Z$ would be the height above or depth below the altitude of the vehicle at the initial conditions for which values are to be measured and calculated. Height and height difference may be directly measured in a conventional manner, such as with an altimeter.

The following amplification of the basic relationships discussed above would be in effect:

$R_o = (A^2 + B^2 + H^2)^{1/2}$
$R = [(A + x)^2 + (B + y)^2 + (H + z)^2]^{1/2}$
$\rho + R_o = R$ $$\rho^2 + 2\rho R_o + R_o^2 = A^2 + 2A \cdot x + x^2 + B^2 + 2B \cdot y + y^2 + H^2 + 2H \cdot z + z^2$$

Since, $R_o^2 = A^2 + B^2 + H^2$, $$\rho^2 + 2\rho R_o = x^2 + 2A \cdot x + y^2 + 2B \cdot y + z^2 + 2H \cdot z, \text{ or}$$
$$\rho^2 - (x^2 + y^2 + z^2)/2 = A \cdot x + B \cdot y + H \cdot z - R_o\rho.$$

Orthonormal functions may be obtained in the manner outlined above from the values of $x$, $y$, $z$ and $\rho$. From these functions, it is likewise possible to determine the values of $A$, $B$, $H$ and $R_o$, again in a manner similar to that which has been described.

Assuming the application where the vehicle is an aircraft equipped with an altimeter, height $H$ is conveniently directly measurable. Therefore, as a check on the values of $A$ and $B$, which are the quantities of primary importance, that are obtained from the above, the measured $H$ may be directly compared with the calculated $H$.

The above discussion speaks in terms of a vehicle moving with respect to a transmitting source. Of course, the roles of the two may be reversed and the method would still have equal validity.

Figure 2:
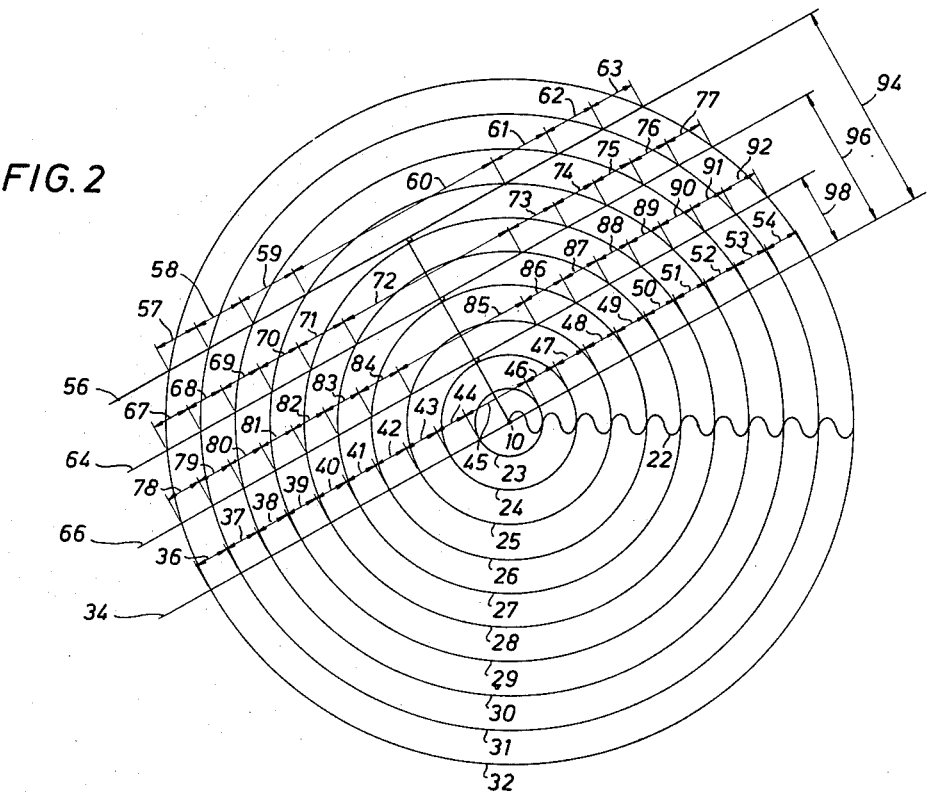
FIG. 2 is a graphical geometric analysis of the invention operating in a typical fashion, wherein the moving vehicle is tracking a straight path.

Referring now to FIG. 2, an omnidirectional transmitter located at a source 10 is illustrated emanating a signal. Again, the transmission may be a carrier signal in the VHF or UHF range, modulated with a stable sine wave signal. The transmission quality need be no better than the quality employed in good commercial practice.

The stable low frequency signal is applied to the carrier in such a manner to produce FM, AM or SSB modulation in conventional manner. In one actual experimental use of the invention, a carrier frequency of 167 MHz was used FM modulated with a stable frequency of 100 kHz. A modulation frequency of from 50 kHz to 500 kHz is preferred.

Illustrated in FIG. 2 is a sine wave 22 representative of the modulation product on the carrier. At a frequency of 100 kHz, each period has a length or distance of 3,000 meters. Concentric circles 23 through 32 are drawn for purposes of illustration, each having a center at source 10 and respective radiuses equal to one times the wave length of the modulation frequency, two times the wave length, three times the wave length and so forth up to n times the period. Actually, any group of concentric circles having a center at source 10 with radiuses forming a linear mathematical series may be employed to illustrate the theory of operation.

A straight line or path 34 is drawn that passes through source 10, the center of the circles. In doing so, it may be further noted that path 34 intersects the tangents of the circles it encounters at right angles. Since the frequency is stable, it may be further noted that the spacing of these encounters is uniform. That is, the distances 36 through 54 to each successive encounter are equal to each other. A vehicle moving along path 34, or any other path that intersects the tangents of the concentric circles at right angles and the center of the circles, will receive the stable-frequency signal emanating from source 10 such that the periods are uniformly spaced as described above.

By contrast, observe another straight line path 56 that does not pass through source 10. Since it does not pass through source 10, path 56 encounters each of the concentric circles at an angle oblique to the circle tangent at the point of encounter. More importantly for purposes of the present invention, observe the spacings between the encounters. Illustrated in FIG. 2 are successive spacing distances 57 through 63 between circles. Again, the distance 60 is not truly in the series, but one-half distance is. By examination, it may be observed that distances 57, 58, 59 and one-half 60 tend to progressively get longer and distances one-half 60, 61, 62 and 63 tend to progressively get shorter.

Now observe paths 64 and 66 located at intermediate locations between paths 34 and 56. The spacing distances 67–77 between circle encounters along path 64 are seen to have less variation from distance to distance than along path 56, but the spacing distance progression is of the same type. This is further confirmed by observing spacing distances 78–92 along path 66.

Figures 3, 4:
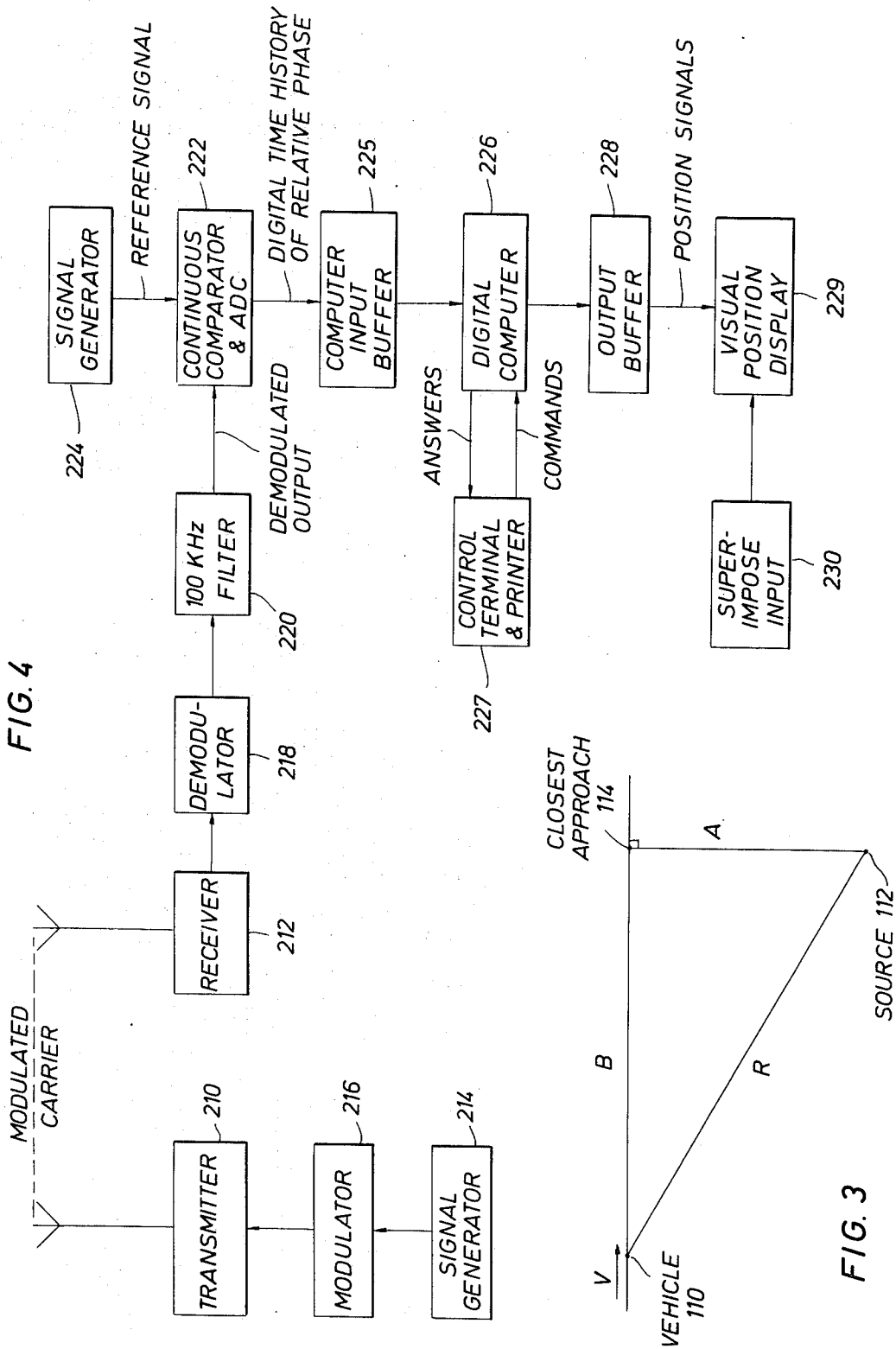
FIG. 3 is a geometric arrangement of a source and a moving vehicle arranged in a typical orientation for locating one with respect to the other in accordance with the present invention.
FIG. 4 is a simplified block diagram of preferred apparatus in accordance with the present invention.

Now referring to FIG. 3, a moving vehicle 110 is shown travelling at a non-accelerating velocity $V$ an $R$ distance from source 112 so that the path of travel will pass through closest approach point 114. This closest approach point is the point on the path of the vehicle where a line drawn from source 112 intersects the path at a right angle. The distance from source 112 to closest approach point 114 is identified as distance A and the distance from vehicle 110 to closest approach point 114 is identified as distance B. If C is the propagation velocity (and the vehicle is moving relatively slowly with respect thereto so that second order effects may be ignored), $t$ equals the time for radio transmissions to travel the distance from source 112 to vehicle 110, and $F_o$ is equal to the frequency of the transmissions at the source, then the source emits a wave equal to sin $(2\pi F_o t)$ and the vehicle receives a wave equal to sin $2\pi F_o[t - R/C]$, where $R = [A^2 + (B - Vt)^2]^{1/2}$.

By tracking the received signal using an oscillator tuned to $F_o$ at successive times $t_1, t_2, \ldots t_n$, it is not possible to determine the values of $R_1 = [A^2 + (B - Vt_1)^2]^{1/2}$, $R_2 = [A^2 + (B - Vt_2)^2]^{1/2}$, etc., directly but it is possible to determine $\delta R_1 = 0$; $\delta R_2 = R_2 - R_1$; $\delta R_3 = R_3 - R_1$; $\ldots \delta R_n = R_n - R_1$.

It is common that there are some suspicions about $R$, and therefore a guess can be made as to its value. If $R_g$ stands for the value of this guess, which may be an informed or educated guess based on some independent information or assumption, then $R_g + \delta R_1$, may be defined as equal to $\rho_1$. Similarly, $\rho_2 = R_g + \delta R_2, \ldots \rho_n = R_g + \delta R_n$.

Should $R_g$ be guessed correctly, then a representative $\rho$, e.g., $\rho_j$, is equal to $R_j$ and hence $\rho_j^2 = A^2 + (B - Vt_j)^2$, or $\rho_j^2 = A^2 + B^2 - 2BVt_j + V^2 t_j^2$. Note that, in this fortuitous case, the squares of $\rho_j$ are a pure quadratic in time, containing no terms in $t$ higher than $t^2$.

Since it is unlikely that $\rho_j = R_j$, it is possible nevertheless to fit $\rho_j$ in some appropriate best fit sense with a quadratic having coefficients $\alpha$, $\beta$ and $\gamma$, so that $\rho \approx \alpha + \beta t_j + \gamma t_j^2$. By appropriate pairing, then $\alpha$ is treated as equal to $(A^2 + B^2)$, $\beta$ is treated as equal to $-2BV$ and $\gamma$ is treated as equal to $V^2$. Hence, $V_1 = \gamma^{1/2}$; $B_1 = -\beta/2V_1$ and $A_1 = (\alpha - B_1^2)^{1/2}$.

If $R_g$ is wrong, it turns out that the quadratic is a poor fit to $\rho_j$. It is possible to make a second educated guess by taking the rms difference between the $\rho_j$ resulting from the first $R_g$ and the corresponding fitted quadratic form as an error measure.

The assumption that $F_o$ be known is not a necessary one. Any error as to the value of $F_o$ merely introduces a linear drift in the measured values of $\delta R$. Thus, it is possible to minimize the rms error as a function of two variables $R_g$ and $F_o$ to find the actual values of A, B, $F_o$ and V.

The above mathematical analysis was made using what may be referred to as the phase method for learning from a record of the received signal at a vehicle from the source the above geometric and velocity parameters.

However, it is not necessary to use a phase method of computation. For example, it may not be possible to maintain continuous phase track, but perhaps it is possible to either intermittently track in phase or measure the momentary frequency being received. In that event, a frequency analysis, thinking of frequency as a derivative of phase, can be performed with similar results.

It should be specifically noted that in the straight line, nonaccelerated path case, if all of the data is collected as for the case described in connection with FIG. 1, then the straight line case is just a degenerate case of the general. The coordinate system could be established along the path so that one of the axis dimensions (either $x$ or $y$) is always zero.

On the other hand, note specifically in the discussion of the straight line, nonaccelerated path case above, no information whatsoever is needed for the method to operate successfully. In this method the source is found in an arbitrary coordinate system related to the vehicle path and even the vehicle velocity is determined as an output by product. See $V_1 = \gamma^{1/2}$ above.

Note also, in a single straight line pass for data gathering, there is a port-starboard ambiguity which must be resolved either by foreknowledge or by making another pass in a different direction.

Now referring to FIG. 4, a simplified block diagram is shown, wherein transmitter 210 is situated at the source to be located and receiver 212 is located within the moving vehicle from which the source position is to be located. As mentioned above, the transmitter emits a carrier of good commercial quality, preferably in the VHF or UHF range. The output from stable sine wave generator 214 is modulated on the carrier signal via an appropriate modulator 216. Sulzer Oscillator Model 1140-5, Austron, Inc. may be used as the stable signal generator.

The receiver at the vehicle is connected to an appropriate demodulator 218 for demodulating the known frequency of signal generator 214. The demodulator output is then preferably applied to passband filter 220 for removal of noise and other modulation products that may be present. For illustrative purposes it is assumed that the operating modulation frequency is 100 kHz, and hence a 100 kHz filter is shown.

An oscillator-controlled continuous comparator 222 operating as a phase tracker is connected to the output of filter 220. It may be useful for the output from the phase tracker to be in digital form; therefore, as shown in the block diagram, the comparator is combined with an analog-to-digital converter. For 100 kHz, the tracker may resolve to one thousand of a period, corresponding to a distance of 3 meters. Stable or reference signal generator 224 is applied as the reference signal or control signal input to the comparator. Rubidium Time Standard, Model 304-B, Tracor, Inc., may be used as signal generator 224. The output of the comparator is, in turn, applied to a digital computer 226 for position determination, through a conventional computer input buffer 225. A Nova 1,200 computer, Data General Corporation, may be employed as digital computer 226 for purposes of the invention.

Control input to the digital computer, such as is useful in supplying educated guess values of A, B and measured inputs $x$ and $y$ (refer to discussion of FIG. 1), may conveniently be applied through control terminal and printer 227. This unit may conveniently be Teletype Terminal, ASR 33, Teletype Corporation. Not only is input data supplied from this unit, but also answers from the computer may be read back, such as the error answers referred to above.

In addition, the position output from the digital computer may be displayed on a scope. That is, once actual range and bearing information is determined via the iteration process, it may be desirable to show this relative information on a visual position display unit. Therefore, another output connection from digital computer 226 may be made to visual position display 229 through a conventional output buffer 228 for this purpose. If it is also desired to superimpose a north-south coordinate system, or any other external data, on the same scope, this may be done via another input to the scope from an appropriate input unit 230. CRT Display, Model 611, Tektronics Corp., may be used for display 229.

In operation of the equipment assuming movement in accordance with FIG. 2, assume that the vehicle is moving along a straight path, such as path 56. The standard reference cycles occur at the standard rate. However, the effective rate of cycles in the demodulated received signal is spread out and varies in accordance with the theory discussed above. The tracker continuously compares the period difference of the two applied signals, and hence the phase or frequency difference of the two applied signals, to develop a time history of the relative distance traveled by the moving vehicle with respect to the source in terms of the number of cycle differences and the rate of their occurrences. Assuming once again movement along path 56, the comparisons described above effectively measure distances 57 through 63 and hence the crossover occurrences or encounters of the path with respect to the concentric circles.

As mentioned above, the tracker may be conveniently set to resolve in a predetermined fraction of a period, rather than complete periods, for purposes of giving more precise information. By measuring or recording the time between digital counts, there is soon determined at a series of times $t$ the corresponding distances $\Delta B$ for use in iterative computation by the computer connected to the tracker. The time of passing at the closest approach point is readily ascertainable from the timing of the counts. That is, when the counts go from being progressively further apart to progressively closer together, the path has passed through the closest approach point, as explained above. With a known velocity of the aircraft, the only two values in the following formula not known are $\rho_j$ and A: $\rho_j^2 = A^2 + B^2 - 2BVt_j + V^2t_j^2$. As explained above, it may be easier to work from $\alpha$, $\beta$ and $\gamma$ values, but the point is values of $\rho_j$ may be assumed and $A$ computed for an iterative series of the known values of the other parameters until $A$ always comes out equal to the same value. Then, the $\rho$'s are known to be correct and the $R$ values are determined as equal respectively to the $\rho$ values. Hence, by continuously refining the initial range and other assumptions, the vehicle-to-object geometry as a function of time is accurately determined.

It is also observed that there are an infinite number of paths that the measurements would fit, but all of these paths would have the same value of $A$. That is, not only does path 56 in FIG. 2 fit the intersection sequence of the circles, so do all other paths having a value of $A$ equal to distance 94 for path 56. Similarly, if path 64 fits the intersection sequence, so do all other lines having an $A$ value equal to distance 96. But, no other path closer or further from the center would satisfy the measured conditions. Hence, if the direction and absolute position of the moving vehicle is known, not only range and bearing of source 10 is known, but source 10 at the center of the concentric circles may be absolutely determined. For improved accuracy in bearing and distance information, it is recommended that after one pass with the vehicle, a second pass be made along another path past the source, preferably at an angle which is non-parallel with the first path.

The above description also assumes that the vehicle actually passes through the closest approach point. It is possible, however, from measuring the distance between concentric circle crossovers or encounters, to fit the path to a path passing a certain distance from the center without having to actually pass through the closest approach point. In fact, even if the path of the vehicle is not along a straight line, but is along a curved path, the computations may still be made in accordance with the disclosed invention, as set forth in the description of FIG. 1.

It has been suggested above that the transmitter be located at the source and the receiver located in the moving vehicle. The location system described above works equally well when the roles of the source and vehicle are reversed.

Also, the oscillator at the transmitter and receiver are stated to be of stable quality and of equal frequency. The signal generators or oscillators have only to be stable over the duration of tracking. If the vehicle is an airplane tracking a transmitter located at a source on the ground or at sea, then this duration of tracking is likely only to be a few minutes. If the frequencies are not exactly the same, again there is no great harm done so long as each remains constant during the period of tracking and so long as measurements are taken on both sides of the closest approach point. That is, if the frequencies differ, the crossover points would occur more rapidly than they should on one side of the approach point (indicating that the moving vehicle is passing closer to the source than it actually is) and the crossover points would occur at a slower rate on the opposite side of the approach point (indicating the moving vehicle is passing further from the source than is actually the case). An average value would then be the actual path.

The oscillator at the source and the vehicle may be independent of outside influences. However, either may be controlled by a signal received outside of the station, either vehicle or source, such as is transmitted from WWV. Or, one oscillator may be used to control the oscillator at other station, source or vehicle, through external circuitry not shown, but well within the skill known in the art.

The computer may merely read out on a conventional computer readout or printout the range and distance information computed, in terms of values correlated with the information known about the vehicle. Such printout will reveal the absolute location information for the source. Alternatively, however, the information may be displayed on a scope or screen to permit direct physical observance of the source with respect to the vehicle, as explained above.

Moreover, if there are a plurality of sources that need to be located, the receiver in the vehicle may time share reception to permit this. Further, the transmissions from each of the sources may be coded, either by carrier frequency or through a modulation product on another frequency band from the locating frequency used in accordance with this invention. Such coding would permit distinguishing the transmissions from one source from the transmissions from other sources.

While a particular embodiment of the invention has been shown, it will be understood that the invention is not limited thereto, since many modifications may be made and will become apparent to those skilled in the art.

What is claimed is:

1. A method for locating a source with respect to a moving vehicle, one of said source and vehicle transmitting a stable frequency signal, which method comprises, at the other of said source and moving vehicle, the steps of:

receiving the transmitted stable frequency signal, continuously comparing the phase difference between said received signal and a standard signal having approximately the same frequency as said received signal to develop a time history of the relative distance traveled by the one of said source and vehicle with respect to the other, and ascertaining from assumed approximate initial range and direction of one of said source and vehicle with respect to the other and from said time history of relative distance traveled by computational procedure the relative direction and distance of said source with respect to said vehicle.

2. A method for locating a source with respect to a moving vehicle, said source transmitting a carrier wave modulated with a stable signal, which method comprises, at the moving vehicle, the steps of:

receiving the transmitted modulated carrier, demodulating the carrier to develop the received signal, continuously comparing the phase difference between said received signal and a standard signal having approximately the same frequency as said received signal to develop a time history of the relative distance traveled by the moving vehicle with respect to said source, and ascertaining from assumed approximate initial range and direction of the source with respect to the vehicle and from said time history of relative distance traveled by computational procedure the relative direction and distance of the source with respect to the vehicle.

3. The method as set forth in claim 2, wherein said vehicle moves in a substantially straight line.

4. The method as set forth in claim 2, wherein said vehicle moves first in one substantially straight line and subsequently in a nonparallel substantially straight line.

5. The method as set forth in claim 2, wherein said source is transmitting a carrier fm modulated with said stable sine wave signal and wherein said stable sine wave signal is at a constant frequency in the range between 50 kHz and 500 kHz.

6. The method as set forth in claim 2, wherein said stable signal is derived from an externally received signal emanating from outside the source.

7. The method as set forth in claim 2, wherein said standard signal is derived from an externally received signal emanating from outside the vehicle.

8. The method as set forth in claim 2, wherein said stable signal is derived from an externally received signal emanating from the vehicle.

9. A method for locating a source with respect to a moving vehicle, said source transmitting a carrier wave modulated with a stable sine wave signal, which method comprises, at the moving vehicle, the steps of:
receiving the transmitted modulated carrier,
demodulating the carrier to develop the received sine wave signal,
separating the received sine wave signal from other demodulation signals which might be present,
continuously comparing the frequency or phase difference between said received sine wave signal and a standard signal having approximately the same frequency as said received sine wave signal to develop a time history of the relative distance traveled by the moving vehicle with respect to said source, and
ascertaining from assumed approximate initial range and direction of the source with respect to the vehicle and from said time history of relative distance traveled by computational procedure the relative direction and distance of the source with respect to the vehicle.

10. A method for locating a station with respect to a moving source, said source transmitting a carrier wave modulated with a stable signal, which method comprises, at the station, the steps of:
receiving the transmitted modulated carrier,
demodulating the carrier to develop the received signal,
continuously comparing the phase difference between said received signal and a standard signal having approximately the same frequency as said received signal to develop a time history of the relative distance traveled by the moving source with respect to said station, and
ascertaining from assumed approximate initial range and direction of the station with respect to the source and from said time history of relative distance traveled by computational procedure the relative direction and distance of the station with respect to the source.

11. A method for locating a station with respect to a moving source, said source transmitting a carrier wave modulated with a stable sine wave signal, which method comprises, at the station, the steps of:
receiving the transmitted modulated carrier,
demodulating the carrier to develop the received sine wave signal,
separating the received sine wave signal from other demodulation signal which might be present,
continuously comparing the frequency or phase difference between said received sine wave signal and a standard signal having approximately the same frequency as said received sine wave signal to develop a time history of the relative distance traveled by the moving source with respect to said station, and
ascertaining from assumed approximate initial range and direction of the station with respect to the source and from said time history of relative distance traveled by computational procedure the relative direction and distance of the station with respect to the source.

12. Apparatus for determining the location of an object with respect to a moving vehicle, which comprises
at the first of said object and vehicle,
a transmitter for generating a stable frequency signal, and
at the other of said object and vehicle,
a receiver,
standard frequency means providing a standard signal approximately equal in frequency to said stable frequency signal,
means for continuously comparing the received stable frequency singal and said standard signal to develop a time history of the relative distance traveled by said moving vehicle with respect to said object, and
computer means connected to said comparing means for using said developed time history to refine initial assumptions regarding vehicle-object geometry for iteratively developing a precise vehicle-object geometry as a funtion of time.

13. Apparatus for determining the location of an object with respect to a moving vehicle, which comprises
at said object,
a transmitter including means for generating a source carrier wave with a modulation signal at a stable frequency, and
at said moving vehicle,
a receiver,
means connected to said receiver for separating the received modulation signal from said carrier and other existing modulation components,
standard frequency means producing a standard signal approximately equal in frequency to said modulation signal,
means for continuously comparing the separated modulation signal and said standard signal to develop a time history of the relative distance traveled by said moving vehicle with respect to said object, and
computer means connected to said comparing means for using said developed time history to refine initial assumptions regarding vehicle-object geometry for iteratively developing a precise vehicle-object geometry as a function of time.

14. Apparatus as set forth in claim 13, wherein said computer means includes converting means for changing said time history from analog form to digital form for computer processing.

15. Apparatus as set forth in claim 13, and including at said moving vehicle, display means for graphically showing the developed vehicle-object geometry as a function of time.

16. Apparatus as set forth in claim 13, wherein said modulation signal is at a stable frequency in the range between 50 kHz and 500 kHz.

17. Apparatus as set forth in claim 13, and including at said object, means for deriving said modulation signal from an externally received signal emanating from outside said object.

18. Apparatus as set forth in claim 13, and including at said moving vehicle, means for deriving said standard signal from an externally received signal emanating from outside said vehicle.

19. Apparatus as set forth in claim 11, and including at said object, means for deriving said modulation signal from an externally received signal emanting from said vehicle.

20. Apparatus as set forth in claim 13, wherein said computer means includes means for furnishing distance data of said moving vehicle from an assigned initial position.

21. Apparatus as set forth in claim 13, and including a display connected to said computer means for visually presenting vehicle-object geometry.

22. Apparatus for determining the location of a station with respect to a moving source, which comprises
at said moving source,
  a transmitter including means for generating a source carrier wave with a modulation signal at a stable frequency, and
at said station,
  a receiver,
  means connected to said receiver for separating the received modulation signal from said carrier and other existing modulation components,
  standard frequency means producing a standard signal approximately equal in frequency to said modulation signal,
  means for continuously comparing the separated modulation signal and said standard signal to develope a time history of the relative distance traveled by said moving source with respect to said station, and
  computer means connected to said comparing means for using said developed time history to refine initial assumptions regarding source-station geometry for iteratively developing a precise source-station geometry as a function of time.

23. A method for locating a source with respect to a moving vehicle, one of said source and vehicle transmitting a stable frequency signal, which method comprises, at the other of said source and moving vehicle, the steps of:
  receiving the transmitted stable frequency signal,
  continuously comparing the phase difference between said received signal and a standard signal having approximately the same frequency as said received signal to develop a time history of the relative distance traveled by one of said source and vehicle with respect to the other,
  assigning each said source and said moving vehicle to parallel systems of Cartesian coordinates,
  iteratively ascertaining from assumed initial distance values in the assigned Cartesian coordinate system of said source and vehicle with respect to each other, the Cartesian coordinate distance values of the moving vehicle at selected periods of time from an assigned initial position of said vehicle, and from said time history of the relative distance traveled, the relative direction and distance of said source with respect to said vehicle.

24. The method as set forth in claim 23, wherein said iterative ascertaining step is performed by minimizing error $E$ in the following formula for assumed assigned values of $A$ and $B$ $$E = \sqrt{\frac{\sum_{1}^{n} [\rho(\rho + 2R_o) - x(x + 2A) - y(y + 2B)]^2}{n}},$$

wherein
  $n$ = number of selected occurrences for which data is measured,
  $\rho$ = relative distance traveled between source and vehicle from an assigned initial position,
  $R_o = (A^2 + B^2)^{1/2}$ = distance between source and vehicle at the initial position,
  $x$ = the first Cartesian coordinate axial distance moved by the vehicle from the initial position,
  $y$ = the second Cartesian coordinate axial distance moved by the vehicle from the initial position,
  $A$ = the first Cartesian coordinate axial distance from the source to the vehicle in the initial position,
  $B$ = the second Cartesian coordinate axial distance from the source to the vehicle in the initial position,
the $A$ and $B$ values producing the minimum $E$ determining range and direction from source to vehicle in the initial position.

25. A method for locating a source with respect to a moving vehicle, one of said source and vehicle transmitting a stable frequency signal, which method comprises, at the other of said source and moving vehicle, the steps of:
  receiving the transmitted stable frequency signal,
  assigning each said source and said moving vehicle to parallel systems of Cartesian coordinates,
  developing at successive $n$ locations, $x$, $y$ and $\rho$ linearly independent measured sequences,
wherein,
  $n$ = number of selected occurrences for which data is developed,
  $x$ = the first Cartesian coordinate axial distance moved from the initial relative position,
  $y$ = the second Cartesian coordinate axial distance moved from the initial relative position, and
  $\rho$ = relative distance travelled between source and vehicle from an assigned initial position,
  constructing orthonormal functions from said $x$, $y$ and $\rho$ sequences to fit the following equation:

$$\rho^2 - (x^2 + y^2)/2 = A \cdot x + B \cdot y - R_o \cdot \rho,$$

wherein, $A$ = the first Cartesian coordinate axial distance from the source to the vehicle in the initial position, $B$ = the second Cartesian coordinate axial distance from the source to the vehicle in the initial position, and $R_o = (A^2 + B^2)^{1/2}$ = distance between source and vehicle at the initial position, and
  solving said equation for $R_o$, $B$ and $A$ from the measured values of $x$, $y$ and $\rho$.

26. A method for locating a source with respect to a moving vehicle, one of said source and vehicle transmitting a stable frequency signal, which method comprises, at the other of said source and moving vehicle, the steps of:
  receiving the transmitted stable frequency signal,
  assigning each said source and said moving vehicle to parallel systems of Cartesian coordinates,
  developing at successive $n$ locations, $x$, $y$ and $\rho$ linearly-independent measured sequences,
wherein, $n$ = number of selected occurrences for which data is developed, $x$ = the first Cartesian coordinate axial distance moved from the initial relative position, $y$ = the second Cartesian coordinate axial distance moved from the initial relative position, and $\rho$ = relative distance travelled between source and vehicle from an assigned initial position, constructing orthonormal sequences $\phi_x$, $\phi_y$ and $\phi$ such that there exists constants relating $x$, $y$ and $\rho$ thereto, as follows:

$x = C_{11}\phi_x,$ $y = C_{21}\phi_x + C_{22}\phi_y,$ and $\rho = C_{31}\phi_x + C_{32}\phi_y + C_{33}\phi_\rho$ , multiplying the left side of the following governing equation term-by-term by $\phi_x$ and summing to determine $z_x$:

$\rho^2 - (x^2 + y^2)/z = AC_{11}\phi_x + B(C_{21}\phi_x + C_{22}\phi_y) - R_o(C_{31}\phi_x + C_{32}\phi_y + C_{33}\phi_\rho),$ and the right side to determine $z_x = AC_{11} + BC_{21} - R_oC_{31}$, wherein, $A$ = the first Cartesian coordinate axial distance from the source to the vehicle in the initial position, $B$ = the second Cartesian coordinate axial distance from the source to the vehicle in the initial position, and $R_o = (A^2 + B^2)^{1/2}$ = distance between source and vehicle at the initial position, multiplying the left side of said governing equation term-by-term by $\phi_y$ and summing to determine $z_y$, and the right side thereof to determine $z_y = BC_{22} - R_oC_{32}$, multiplying the left side of said governing equation term-by-term by $\phi_\rho$ and summing to determine $z_\rho$ , and the right side thereof to determine $z_\rho = - R_oC_{33}$, and solving said last three equations for $R_o$, $B$ and $A$ from said measured values of $x$, $y$ and $\rho$.

27. A method for locating a source with respect to a moving vehicle, one of said source and vehicle transmitting a stable frequency signal, which method comprises, at the other of said source and moving vehicle, the steps of:

receiving the transmitted stable frequency signal, assigning each said source and said moving vehicle to parallel systems of Cartesian coordinates, developing at successive $n$ locations, $x$, $y$, $z$ and $\rho$ linearly-independent measured sequences, wherein $n$ = number of selected occurrences for which data is developed, $x$ = the first Cartesian coordinate axial distance moved from the initial relative position, $y$ = the second Cartesian coordinate axial distance moved from the initial relative position, $z$ = the third Cartesian coordinate axial distance moved from the initial relative position, and $\rho$ = relative distance travelled between source and vehicle from an assigned initial position, constructing orthonormal functions from said $x$, $y$, $z$ and $\rho$ sequences to fit the following equation:

$\rho^2 - (x^2 + y^2 + z^2)/2 = A \cdot x + B \cdot y + H \cdot z - R_o \cdot \rho,$ wherein $A$ = the first Cartesian coordinate axial distance from the source to the vehicle in the initial position, $B$ = the second Cartesian coordinate axial distance from the source to the vehicle in the initial position, $H$ = the third Cartesian coordinate axial distance from the source to the vehicle in the initial position, and $R_o = (A^2 + B^2 + H^2)^{1/2}$ = distance between source and vehicle at the initial position, and solving said equation for $R_o$, $B$, $A$ and $H$ from the measured values of $x$, $y$, $z$ and $\rho$.

28. A method for locating a source with respect to a moving vehicle, one of said source and vehicle transmitting a stable frequency signal, which method comprises, at the other of said source and moving vehicle, the steps of:

receiving the transmitted stable frequency signal, assigning each said source and said moving vehicle to parallel systems of Cartesian coordinates, developing at successive $n$ locations, $x$, $y$, $z$ and $\rho$ linearly-independent measured sequences, wherein, $n$ = number of selected occurrences for which data is developed, $x$ = the first Cartesian coordinate axial distance moved from the initial relative position, $y$ = the second Cartesian coordinate axial distance moved from the initial relative position, $z$ = the third Cartesian coordinate axial distance moved from the initial relative position, $\rho$ = relative distance travelled between source and vehicle from an assigned initial position, constructing orthonormal sequences $\phi_x$, $\phi_y$, $\phi_z$ and $\phi_\rho$ such that there exists constants relating $x$, $y$, $z$ and $\rho$ thereto, as follows:

$x = C_{11}\phi_x,$ $y = C_{21}\phi_x + C_{22}\phi_y,$ $z = C_{31}\phi_x + C_{32}\phi_y + C_{33}\phi_z,$ and $\rho = C_{41}\phi_x + C_{42}\phi_y + C_{43}\phi_z + C_{44}\phi_\rho$ , multiplying the left side of the following governing equation term-by-term by $\phi_x$ and summing to determine $z_x$:

$\rho^2 - (x^2 + y^2 + z^2)/2 = AC_{11}\phi_x + B(C_{21}\phi_x + C_{22}\phi_y) + H(C_{31}\phi_x + C_{32}\phi_y + C_{33}\phi_z) - R_o(C_{41}\phi_x + C_{42}\phi_y + C_{43}\phi_z + C_{44}\phi_\rho).$ and the right side to determine $z_x = AC_{11} + BC_{21} + HC_{31} - R_oC_{41}$, wherein, $A$ = the first Cartesian coordinate axial distance from the source to the vehicle in the initial position, $B$ = the second Cartesian coordinate axial distance from the source to the vehicle in the initial position, $H$ = the third Cartesian coordinate axial distance from the source to the vehicle in the initial position, and $R_o = (A^2 + B^2 + H^2)^{1/2}$ = distance between source and vehicle at the initial position, multiplying the left side of said governing equation term-by-term by $\phi_y$ and summing to determine $z_y$, and the right side thereof to determine $z_y = BC_{22} + HC_{32} - R_oC_{42}$, multiplying the left side of said governing equation term-by-term by $\phi_z$ and summing to determine $z_z$, and the right side thereof to determine $z_z = HC_{33} - R_oC_{43}$, multiplying the left side of said governing equation term-by-term by $\phi_\rho$ and summing to determine $z_\rho$ , and the right side thereof to determine $z_\rho = - R_oC_{44}$, and solving said last four equations for $R_o$, $B$, $A$ and $H$ from said measured values of $x$, $y$, $z$ and $\rho$.

* * * * *

PO-1050
(5/69)

UNITED STATES PATENT OFFICE
CERTIFICATE OF CORRECTION

Patent No. 3,863,256                    Dated January 28, 1975

Inventor(s) Spurgeon E. Smith

It is certified that error appears in the above-identified patent and that said Letters Patent are hereby corrected as shown below:

Column 5, line 66, delete "1,900" and insert --1900--.
Column 6, line 27, delete "$\phi$" and insert "$\phi_0$"; line 47, delete "Z" and insert "$Z_0$".
Column 7, line 3, delete "+", first occurrence, insert -- = --.
Column 9, line 65, delete "1,200" and insert --1200--.
Column 14, line 18, delete "singal" and insert --signal--.
Column 17, line 7, delete "$\phi$" and insert "$\phi_0$".

Signed and Sealed this

*fourteenth* Day of *October 1975*

[SEAL]

Attest:

RUTH C. MASON
*Attesting Officer*

C. MARSHALL DANN
*Commissioner of Patents and Trademarks*